US009959898B1

(12) United States Patent
Hsu et al.

(10) Patent No.: US 9,959,898 B1
(45) Date of Patent: May 1, 2018

(54) MAGNETIC DISK DEVICE, CONTROLLER, AND SEEKING METHOD

(71) Applicant: KABUSHIKI KAISHA TOSHIBA, Tokyo (JP)

(72) Inventors: Shihpo Hsu, Yokohama Kanagawa (JP); Takeyori Hara, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days. days.

(21) Appl. No.: 15/694,839

(22) Filed: Sep. 3, 2017

(30) Foreign Application Priority Data

Mar. 27, 2017 (JP) .................................. 2017-060768

(51) Int. Cl.
*G11B 5/55* (2006.01)
*G11B 19/04* (2006.01)
*G11B 5/012* (2006.01)
*G11B 5/596* (2006.01)

(52) U.S. Cl.
CPC ............ *G11B 19/042* (2013.01); *G11B 5/012* (2013.01); *G11B 5/5582* (2013.01); *G11B 5/59694* (2013.01)

(58) Field of Classification Search
CPC .... G11B 5/012; G11B 5/02; G11B 5/54–5/55; G11B 5/5521–5/5586; G11B 5/596–5/59611; G11B 5/59694; G11B 19/04–19/042; G11B 19/045; G11B 19/14
USPC .................. 360/55, 60, 69, 75, 78.04–78.14
See application file for complete search history.

(56) References Cited

U.S. PATENT DOCUMENTS

| 6,064,540 | A | * | 5/2000 | Huang | G11B 21/081 360/75 |
| 6,496,323 | B1 | * | 12/2002 | Umeda | G11B 5/5582 360/78.09 |
| 6,580,579 | B1 | * | 6/2003 | Hsin | G11B 5/5582 360/78.09 |
| 6,614,613 | B1 | * | 9/2003 | Huang | G11B 5/5582 360/75 |
| 7,515,377 | B2 | | 4/2009 | Funabashi et al. | |
| 8,634,159 | B2 | * | 1/2014 | Huang | G11B 19/042 360/77.02 |
| 8,737,013 | B2 | * | 5/2014 | Zhou | G11B 5/59694 360/78.09 |

(Continued)

FOREIGN PATENT DOCUMENTS

JP S63-257970 10/1988

*Primary Examiner* — Wayne Young
*Assistant Examiner* — James L Habermehl
(74) *Attorney, Agent, or Firm* — Patterson & Sheridan, LLP

(57) ABSTRACT

A magnetic disk device includes a magnetic disk having a plurality of tracks, a magnetic head used for writing data on the magnetic disk and reading data from the magnetic disk, a controller configured to control seek operations of the magnetic head, and a vibration sensor. The controller predicts a first vibration caused by a currently executed seek operation, based on a seek control signal, predicts a second vibration based on vibration detected by the sensor, and determines an adjusted start time of the currently executed seek operation so that a phase of the first vibration does not match a phase of the second vibration.

16 Claims, 14 Drawing Sheets

(56) References Cited

U.S. PATENT DOCUMENTS

| | | | | |
|---|---|---|---|---|
| 8,953,278 B1* | 2/2015 | Zhou | ................... | G11B 5/59694 |
| | | | | 360/78.09 |
| 9,082,418 B2* | 7/2015 | Ong | ................... | G11B 5/59694 |
| 9,111,575 B1* | 8/2015 | Zhou | ................... | G11B 19/042 |
| 9,257,135 B2* | 2/2016 | Ong | ................... | G11B 5/59694 |
| 2010/0079906 A1* | 4/2010 | Wile | ................... | G11B 5/5582 |
| | | | | 360/78.09 |

* cited by examiner

MAGNETIC DISK DEVICE, CONTROLLER, AND SEEKING METHOD

This application is based upon and claims the benefit of priority from Japanese Patent Application No. 2017-060768, filed Mar. 27, 2017, the entire contents of which are incorporated herein by reference.

FIELD

Embodiments described herein relate generally to a magnetic disk device, a controller, and a seeking method.

BACKGROUND

When a magnetic disk device receives a read or write command, the magnetic disk device moves to seek a magnetic head to a target track. The head is attached to an actuator. The actuator is rotated and driven by a voice coil motor (VCM) when seeking.

DETAILED DESCRIPTION

Figure 1:
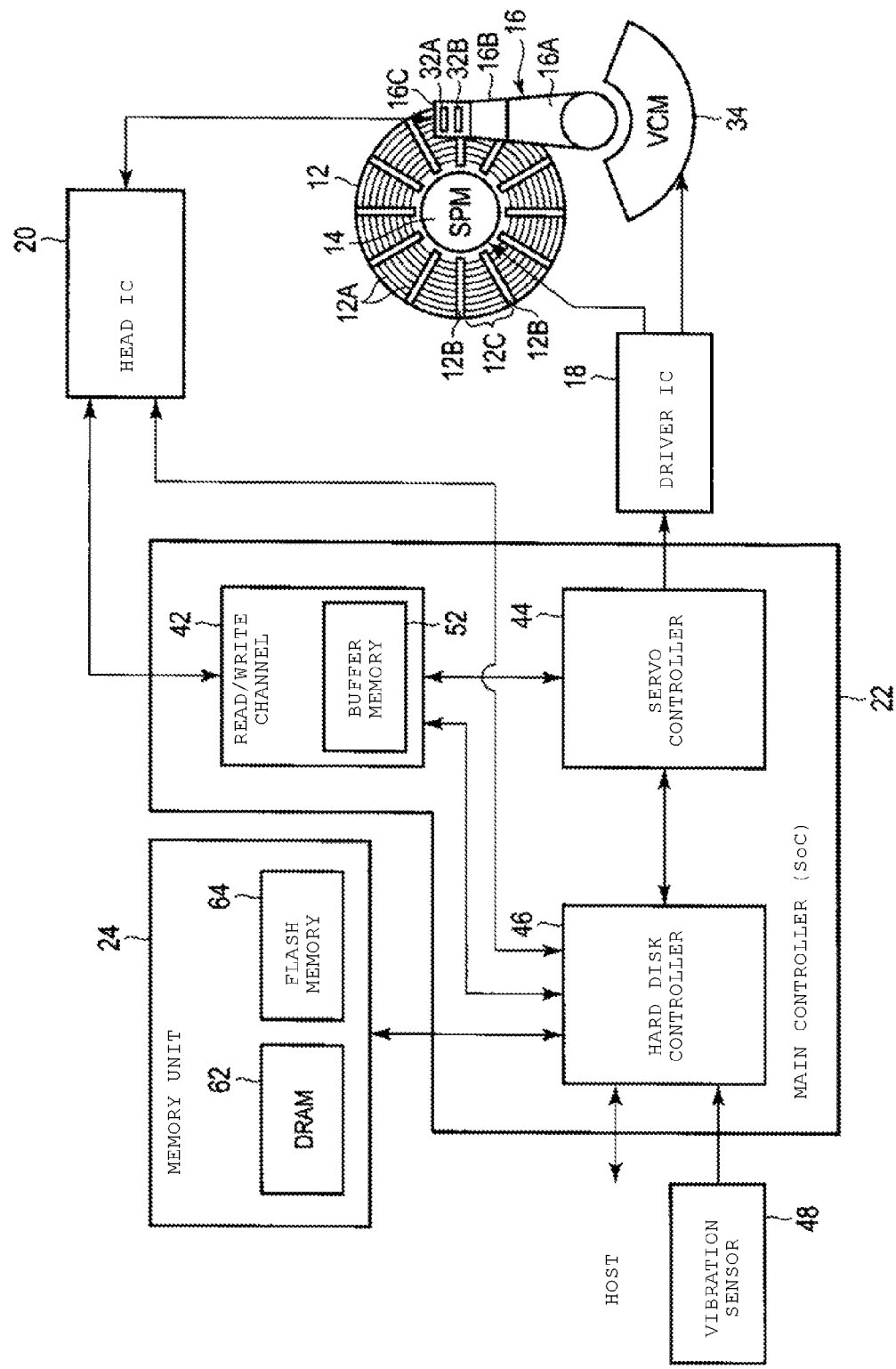
FIG. 1 is a block diagram illustrating one example configuration of a magnetic disk device (also referred to as a hard disk drive) according to an embodiment.

In a magnetic disk device, when a voice coil motor rotates, rotation vibration is caused by the reaction force while a seek operation is taking place. In a case where such vibration occurs, it is difficult to precisely control an actuator to which a magnetic head is attached.

Embodiments provide a magnetic disk device, a controller, and a seeking method which reduces vibration that occurs during seeking.

In general, according to one embodiment, a magnetic disk device includes a magnetic disk including a plurality of tracks, a magnetic head used for writing data in the magnetic disk and reading data from the magnetic disk, a controller configured to control seeking of the magnetic head, and a vibration sensor. The controller predicts a first vibration caused by seeking that is currently underway, based on a current seeking control signal, predicts a second vibration based on vibration detected by the sensor, and adjusts a start timing of the present seeking so that a phase of the first vibration does not match a phase of the second vibration.

Hereinafter, embodiments will be described with reference to the drawings. The disclosure is just an example and is not limited to the contents disclosed in the following embodiments. Modifications which may be easily obtained by those skilled in the related art are included in the scope of this disclosure. The members in the drawings may be schematically illustrated by changing the size, the shape, and the like of the members from those in a practical form, in order to clarify the descriptions. In the plurality of drawings, corresponding components are denoted by the same reference number, and detailed descriptions thereof will be omitted.

First Embodiment

Overall Configuration

FIG. 1 is a block diagram illustrating one example configuration of a magnetic disk device (also referred to as a hard disk drive) according to an embodiment. The magnetic disk device includes a disk 12, a spindle motor (SPM) 14, an actuator 16, a driver IC 18, a head IC 20, a main controller 22, a voice coil motor (VCM) 34, and the like. The main controller 22 is connected to a host device (not illustrated).

The disk 12 is a magnetic recording medium and includes recording surfaces, for example, on both side surfaces thereof. Data is magnetically recorded on the recording surface. The disk 12 is rotated at a high speed by the spindle motor 14. The spindle motor 14 is driven by a current or a voltage which is supplied from the driver IC 18.

Each of the recording surfaces of the disk 12 includes a plurality of tracks 12A. The tracks 12A include a plurality of tracks which are concentric or may be one track which is spirally formed. The disk 12 also includes a plurality of servo areas 12B which extend in a radial direction. Each of the plurality of servo areas 12B is discretely disposed at an equal circumferential interval. Each of the tracks 12A between the servo areas 12B which are adjacent to each other is used as a data region 12C. The servo area 12B in each of the tracks 12A is also referred to as a servo frame. A region which includes the servo area 12B in each of the tracks 12A and the data region 12C adjacent to this servo area 12B is also referred to as a servo sector. The data region 12C includes a plurality of data sectors which have a uniform size, for example, 512 bytes.

Servo data for positioning a head is written in the servo area 12B. The servo data includes a track number, a sector number, and burst data. The sector number is a sector number of a servo sector and the burst data indicates a relative position of the head to the center of a track.

A write head 32A and a read head 32B are disposed proximate a corresponding recording surface of the disk 12. In descriptions in which distinguishing between the write head 32A and the read head 32B is not required, the write head 32A and the read head 32B for a particular recording surface are simply referred to collectively as a head. FIG. 1 illustrates a write head 32A and a read head 32B corresponding to one recording surface. However, a similar write head 32A and a similar read head 32B pair may also disposed for another recording surface. The write head 32A and the read head 32B are attached to a slider 16C. The slider 16C is attached to a tip end of a suspension 16B extended from an arm 16A of the actuator 16. The actuator 16 is driven by the voice coil motor 34. The voice coil motor 34 is driven by a current or a voltage which is supplied from the driver IC 18. The actuator 16 is driven by the voice coil motor 34, and thus the write head 32A and the read head 32B move over the disk 12 so as to draw an arc in the radial direction of the disk 12, and can be positioned at a target track.

FIG. 1 illustrates the magnetic disk device which includes one instance of the disk 12. However, the magnetic disk device in some embodiments may include instances of disks 12 that are stacked, and a plurality of read heads or write heads which correspond to each of the multiple disks.

When multiple instances of double-sided disks having recording surfaces are both surfaces are stacked, two read heads and write heads correspond to each such disk-one read head/write head pair for each surface of each of the plurality of disks. Since one head corresponds to each of the recording surfaces, the recording surface may be indicated by a head number.

The driver IC 18 drives the spindle motor 14 and the voice coil motor 34 in accordance with a control output of a servo controller 44 in the main controller 22. The head IC 20 is also referred to as a head amplifier and includes a variable gain amplifier configured to amplify an output signal of the read head 32B, that is, amplify a read signal. The head IC 20 converts write data output from the main controller 22 (more specifically, a read/write channel 42 in the main controller 22) into a write current, and outputs the write current to the write head 32A.

The main controller 22 is implemented by system LSI. The system LSI is referred to as a system-on-a-chip (SoC), in which a plurality of components is integrated into a single chip. The main controller 22 includes the read/write channel 42, a hard disk controller (HDC) 46, and the servo controller 44. A memory unit 24 which includes a semiconductor memory such as a DRAM 62 or a flash memory 64 is typically external to the main controller 22.

The read/write channel 42 processes a signal which is supplied to the head IC 20 or a signal which is supplied from the head IC 20. The read/write channel 42 includes a buffer memory 52 which is configured with an SRAM in which data is temporarily stored. For example, the read/write channel 42 converts a read signal which is an output signal of the read head 32B, which is supplied from the head IC 20, into digital data. The read/write channel 42 causes digital data to be stored in the buffer memory 52. The read/write channel 42 performs error correction decoding on digital data stored in the buffer memory 52, and decodes read data from the digital data. The read/write channel 42 extracts servo data from digital data stored in the buffer memory 52, and generates a servo sector timing signal based on the extracted servo data. The servo sector timing signal corresponds to a servo sector including a servo area 12B in which the extracted servo data is written (more specifically, data region 12C in the servo sector, which includes the servo area 12B).

The read/write channel 42 causes write data transferred from the hard disk controller 46 to be stored in the buffer memory 52. The read/write channel 42 performs error correction coding on write data which is digital data stored in the buffer memory 52. The read/write channel 42 transfers the coded write data to the head IC 20 and causes the coded write data to be recorded on the disk 12 by the write head 32A.

The hard disk controller 46 is connected to the host device through a host interface. The host device may use the magnetic disk device as the own storage device. The host device and the magnetic disk device are provided, for example, in electronic equipment such as a personal computer, a video camera, a music player, a portable terminal, a mobile phone, or a printer device. The hard disk controller 46 functions as a host interface controller configured to transfer a signal to the host device and to receive signal transferred from the host device. Specifically, the hard disk controller 46 receives a command (write command, read command, seek command, and the like) transferred from the host device. The hard disk controller 46 controls data being transferred between the host device and the memory unit 24. The hard disk controller 46 functions as a disk interface controller. The disk interface controller is configured to control data writing to the disk 12 and data reading from the disk 12 through the read/write channel 42, the head IC 20, the write head 32A, and the read head 32B.

The servo controller 44 controls the spindle motor 14 and the voice coil motor 34 through the driver IC 18. The servo controller 44 controls the voice coil motor 34 in order to move the head 12 to a target track on the disk 12 and to position the head 12 at a target position of the target track. The servo controller 44 performs the control based on a target address and on servo data which are extracted by the read/write channel 42. The control of the voice coil motor 34 is manifested as controlling a rotation angle of the actuator 16.

Each of the hard disk controller 46 and the servo controller 44 includes a microprocessor unit (MPU) (not illustrated). The MPU executes control programs for the hard disk controller 46 and the servo controller 44, respectively, and thus implements the functions of the hard disk controller 46 and the servo controller 44. The control programs are stored in the flash memory 64. A single MPU may execute the control programs via time multiplexing.

The memory unit 24 includes the DRAM 62 and the flash memory 64. The flash memory 64 is a rewritable nonvolatile semiconductor memory. A control program (software) for implementing the functions of the main controller 22 which includes the hard disk controller 46 and the servo controller 44 is stored in a portion of a storage area of the flash memory 64. A mapping table of a logical address and a physical address or information (physical address, logical address, or the like which indicates a defect sector) regarding a defect sector is also stored in another portion of the storage area of the flash memory 64. At least one portion of a storage area of the DRAM 62 is used as a work area for the hard disk controller 46 and the servo controller 44. Read data decoded by the read/write channel 42 is transferred to the DRAM 62, and is temporarily stored in the DRAM 62. Then, the read data is transmitted to the host device. Write data transmitted from the host device is temporarily stored in the DRAM 62, and then is transferred to the read/write channel 42. In FIG. 1, the memory unit 24 is externally attached to the main controller 22. However, the memory unit 24 may be incorporated within the main controller 22.

A vibration sensor 48 is also disposed on a substrate on which the driver IC 18, the head IC 20, the main controller 22, and the memory unit 24 are mounted. The vibration sensor 48 detects vibration of the magnetic disk device (such as vibration causing the entirety of the device to shake and is also referred to as rotation vibration (RV)). The vibration sensor 48 measures the amount of the detected vibration. The vibration sensor 48 is also referred to as an RV sensor. The vibration sensor 48 may be a single sensor configured to directly detect rotation vibration or may be one pair of uniaxial acceleration sensors configured to detect vibration in a linear direction. When one pair of acceleration sensors are used, two acceleration sensors are located at different positions on the substrate, separated by a circumferential interval. The characteristics of the two acceleration sensors are assumed to be the same. An output of the vibration sensor 48 is supplied to the hard disk controller 46 and is stored in the DRAM 62. A storage area of the DRAM 62 for the output of the vibration sensor 48 has a size which allows vibration data generated in for multiple instances of seeking to be stored. A mounting site of the vibration sensor 48 is not limited to being the substrate for the main controller 22, and may be on another substrate. Specifically, any suitable location from which RV vibration of the device can be detected may be used as the mounting site.

Seeking: IBT Method

If a target address is input, the main controller 22 obtains a target track based on the target address and starts a seek operation by moving the head to the target track. The seek operation includes speed control until the head moves proximate to the vicinity of the target track, at which point position control for precisely positioning the head on the target track is employed. The position control is performed based on servo data. The speed control and the position control are each performed by driving the voice coil motor 34. Vibration is commonly caused by actuating the voice coil motor 34, particularly when the voice coil motor 34 is driven via speed control. Speed control includes three periods: an acceleration period, a constant speed period, and a deceleration period. The speed during the constant speed period is determined by the mechanical and electrical characteristics of the voice coil motor 34. An upper limit speed for the constant speed period can be determined prior to performing a seek operation.

Figure 2A:
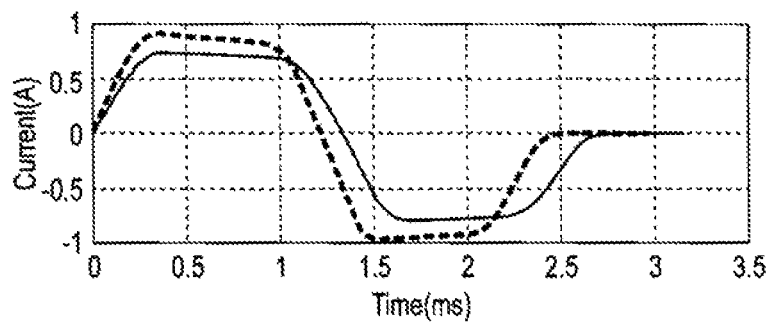
FIGS. 2A and 2B illustrate an example of a seek current and RV vibration.
Figure 2B:
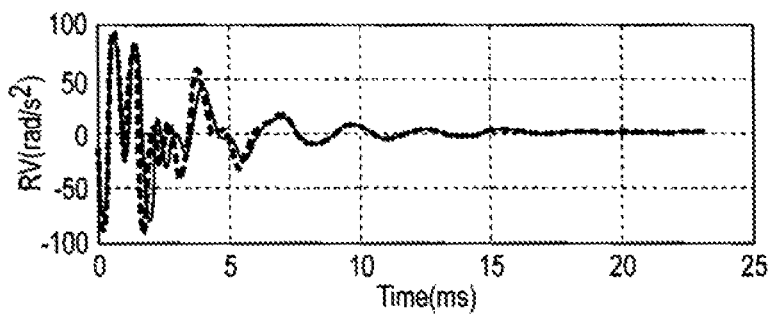

The main controller 22 sets a seek voltage for the speed control in the driver IC 18, and the driver IC 18 supplies a seek current depending on the seek voltage to the voice coil motor 34. FIG. 2A illustrates an example of the seek current. A dashed line indicates a seek current when the speed during the constant speed period is set to the upper limit speed. A solid line indicates a seek current when the speed during the constant speed period is set to a speed that is lower than the upper limit speed. As a result, acceleration and deceleration are reduced during a seek operation. FIG. 2B illustrates vibration (also referred to as RV vibration) of the magnetic disk device when the seek current flows in the voice coil motor 34. When the speed during the constant speed period is set to be the upper limit speed, a value of the root of a square-integrated value of RV vibration indicated by the broken line is 60.474 rad/s$^2$. When the speed during the constant speed period is set to be lower than the upper limit speed, the square-integrated value of RV vibration indicated by the solid line is 50.125 rad/s$^2$. An integration period is a seek period during which random access to the disk 12 is performed, and tracking of the head to a target track occurs. As described above, RV vibration (square-integrated value) generally increases when the speed of the constant speed period is high, and is a function of the speed during the constant speed period. Even when seeking the same distance radially across the disk 12, the RV vibration that occurs varies depending on the speed during the constant speed period.

Figure 3A:
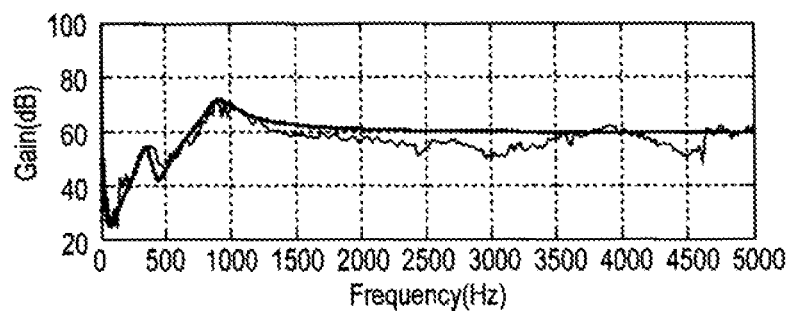
FIGS. 3A and 3B illustrate an example of frequency characteristics of a gain and a phase of RV vibration.
Figure 3B:
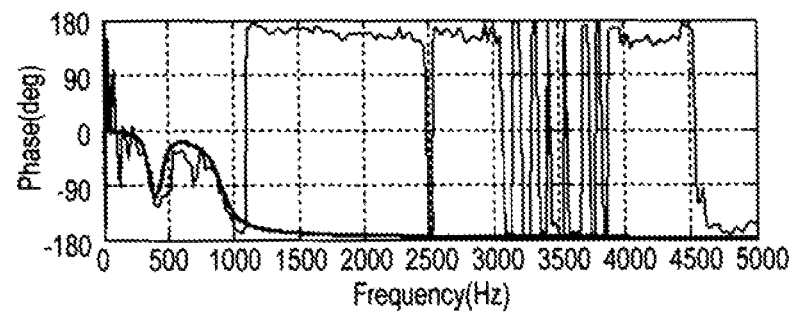

FIGS. 3A and 3B illustrate frequency characteristics of a gain and a phase, respectively, of RV vibration. FIGS. 2A and 2B illustrate a relationship between the seek current and RV vibration during one particular seek operation. However, RV vibration generally continues even though a supply of the seek current to the voice coil motor 34 has stopped. Consequently, RV vibration can include vibration that occurs during the current seek operation being performed, and also can include vibration that was caused by the preceding seek operation. For example, as illustrated in FIG. 2A, the seek current is only supplied to the voice coil motor 34 for a period of about 3 ms (i.e., for one seek period). However, as illustrated in FIG. 2B, even when the seek period has ended, RV vibration continues to occur. RV vibration after the end of the seek period is sometimes referred to as residual vibration. In the example of FIG. 2B, vibration occurs for 20 ms after the start of the seek operation. Thus, when two seek operations are performed in a continuous fashion, and/or if a second seek operation is performed after a first seek operation in a time interval shorter than the time period during which residual vibration from the first seek operation is still occurring, residual vibration caused by the previous seek operation is added to the RV vibration (also referred to as predicted vibration) that is predicted to occur during the following seek operation. Thus, a composite vibration of two vibrations is generated. RV vibration includes a phase component. Thus, when two vibrations each have the same phase and approximately the same frequency, the two RV vibrations are added to each other, and the composite vibration has an increased magnitude. However, when the two vibrations are out of phases with each other with a sufficiently large phase difference that destructive interference occurs between the two vibrations, the two RV vibrations at least partially cancel each other, in which case the composite vibration is smaller than the predicted vibration.

Controlling the phase of the residual vibration is difficult, if not impossible. However, the phase of the predicted vibration caused by the current seek operation that is to be performed can be controlled. If the start timing of such a seek operation is adjusted, that is, the start timing thereof is delayed, the phase of the predicted vibration can be set to be partially or completely in anti-phase to the phase of the residual vibration. In the embodiment, after a certain period (referred to as a break time) elapses from when a read or write address is input, a target track is determined, a seek command is executed, and the seek current is supplied to the voice coil motor 34. The break time is determined based on phases of a peak of predicted vibration and a peak of residual vibration. In this specification, a method of performing a seek operation in which a break time is provided between a seek start command and a start time for supplying a seeking current to the voice coil motor 34 is referred to as an inject break time (IBT) method.

FIG. 3A illustrates frequency characteristics of a gain of composite vibration that includes residual vibration caused by the previously executed seek operation and vibration caused by the currently executed seek operation. FIG. 3B illustrates frequency characteristics of a phase of the composite vibration. A thin line indicates frequency characteristics thereof when first seeking and second seeking are continuously performed without providing a break time after an instruction to start the second seeking. A bold line indicates frequency characteristics thereof when a second seek operation is performed after a break time of 0.4 ms is inserted after the time indicated by an instruction to start the second seek operation. As indicated by the bold line in FIG. 3A, when the break time is provided, the frequency characteristics of the gain show a single peak. Thus, the phase, the polarity, and the amplitude of the peak of the residual vibration can be predicted based on a measured vibration of the previously executed seek operation.

Figure 4A:
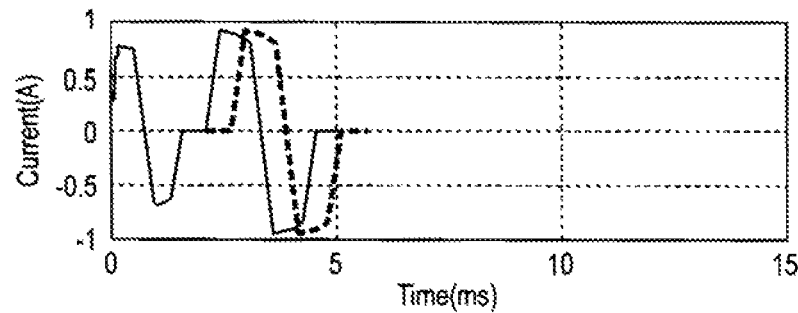
FIGS. 4A and 4B illustrate an example of a seek current and RV vibration when seek operations are performed twice in sequence.
Figure 4B:
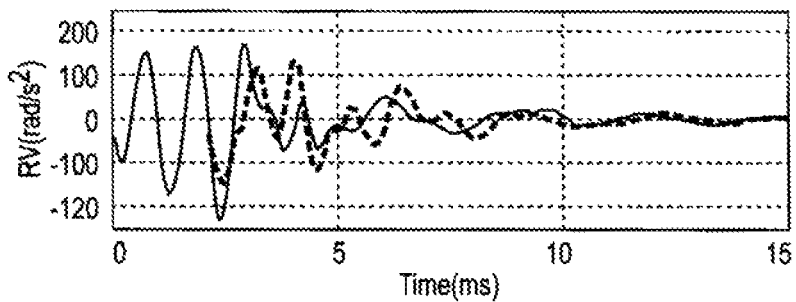

FIG. 4A illustrates seek currents of a first case (shown by solid line) where the first seek operation and the second seek operation are continuously performed, and a second case (shown by broken line) where a break time of 0.4 ms is inserted between the first seek operation and the second seek operation. The seek currents during the period of the first seek operation are the same in the both cases. Thus, for clarity, the broken line indicates the portion of the second case in which the timing of the seek currents differs from the timing of the seek current in the first case. FIG. 4B illustrates RV vibrations of a first case (shown by solid line) where the first seek operation and the second seek operation are continuously performed, and a second case (shown by broken line) where a break time of 0.4 ms is inserted between the first seek operation and the second seek operation. The RV vibrations during the period of the first seek operation are the same in both cases. Thus, for clarity, the broken line indicates the portion of the second case in which the RV vibrations in the second case differ from the RV vibrations in the first case. As indicated by the solid line in FIG. 4B, a square-integrated value of the RV vibration when the first seek operation and the second seek operation are continuously performed without a break time therebetween is 101.49 rad/s$^2$. The integration period is not limited to a first seek period that occurs during the first seek operation and a second seek period that occurs during the second seek operation, and lasts for a time that is independent of the second seek period, for example, 15 ms in FIG. 4. As indicated by the broken line in FIG. 4B, the following is understood. A square-integrated value of the RV vibration when the second seek operation is performed after the break time of 0.4 ms elapses from the end of the first seeking is 93.58 rad/s$^2$. Thus, RV vibration is reduced by inserting the break time.

Figure 5:
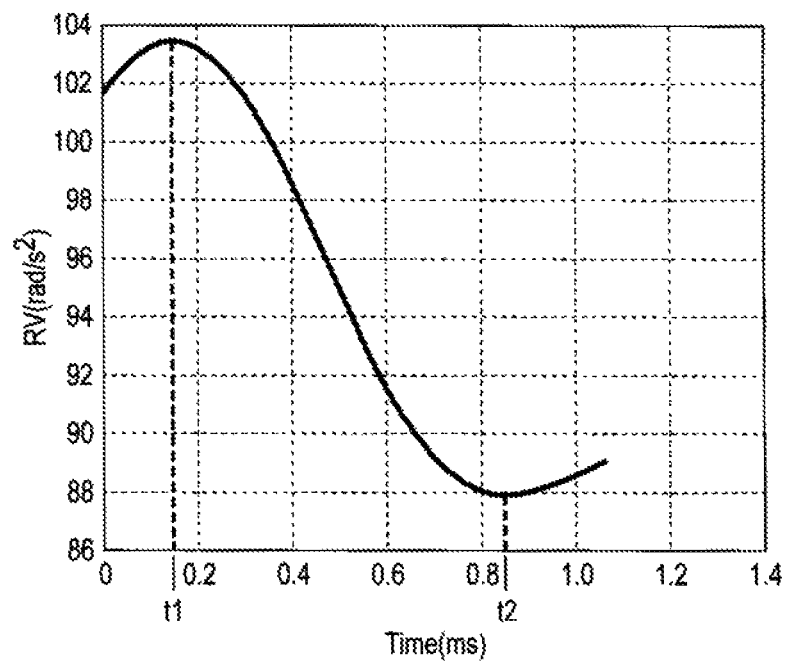
FIG. 5 illustrates an example of a relationship between a break time and composite vibration.

FIG. 5 illustrates how composite vibration (square-integrated value) of residual vibration caused by the previously executed seek operation and vibration caused by the currently performed seek operation is changed by the break time. As shown, as the break time is gradually increased from 0, the composite vibration also gradually increases. Once the break time exceeds a first time t1, the composite vibration gradually decreases as the break time increases. Once the break time exceeds a second time t2, the composite vibration gradually increases as the break time increases. FIG. 5 shows that the break time t2 causes composite vibration to be smallest. Thus, if the break time t2 is determined, and the seeking start timing is controlled based on break time t2, composite vibration may be reduced.

Figure 6:
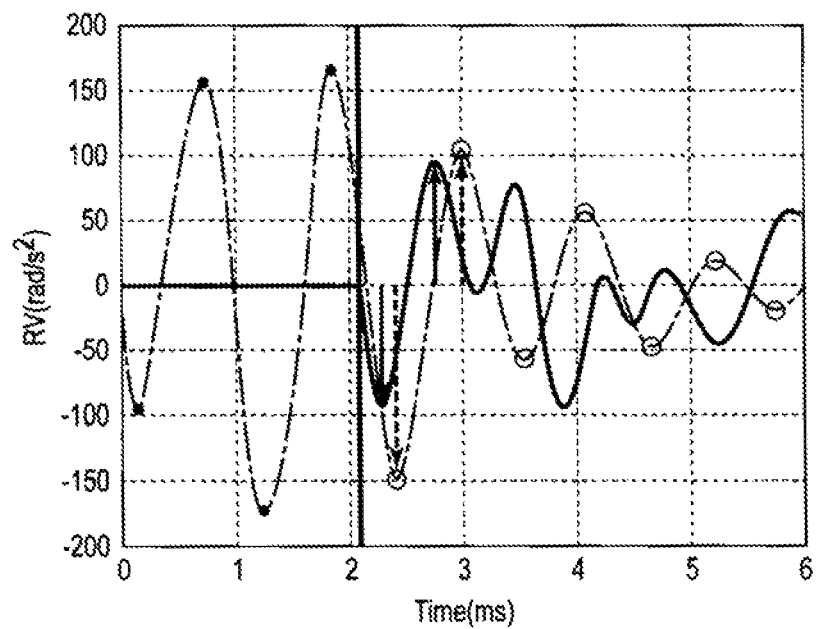
FIG. 6 illustrates an example of residual vibration and vibration caused by the currently executed seek operation when the break time is 0.

FIG. 6 illustrates vibration (shown by dash-dot line) of the previously executed seek operation and vibration (shown by solid line) of the currently executed seek operation when the break time is 0. A bold vertical line represents a time indicated by an instruction to start the present seek operation. If a read or write command is received from the host device, the main controller 22 obtains a target track from a read or write address, and instructs the servo controller 44 to start a seek operation for the target track. A timing of this instruction is the timing indicated by the bold vertical line. Composite vibration (square-integrated value) of residual vibration and vibration caused by the presently executing seek operation is 101.49 rad/s$^2$.

Figure 7:
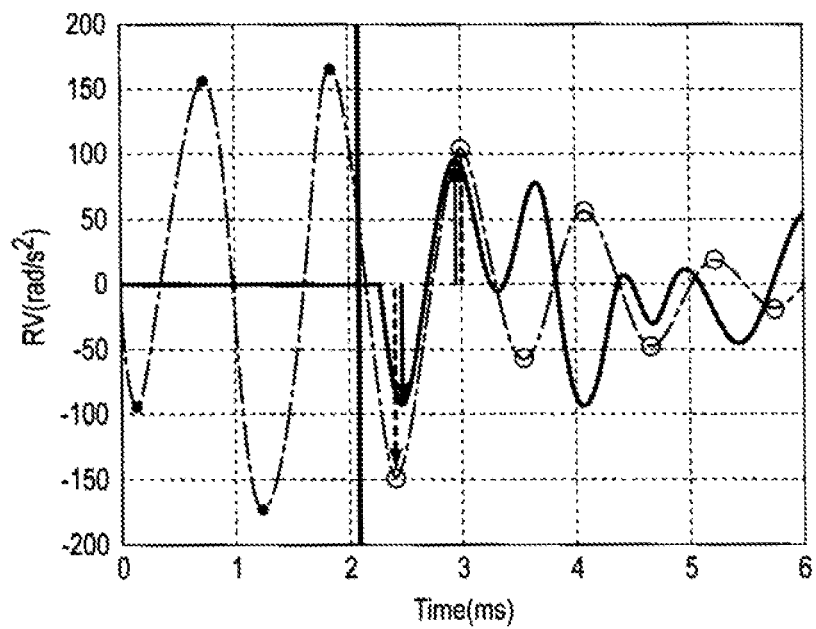
FIG. 7 illustrates an example of residual vibration and vibration caused by the currently executed seek operation when the break time is t1.

FIG. 7 illustrates vibration (shown by dash-dot line) of the previously executed seek operation and vibration (shown by solid line) of the currently executing seek operation when the break time is t1, for example, 0.15 ms. A bold vertical line represents a time indicated by an instruction to start execution of the current seek operation. Phases of residual vibration of the previously executed seek operation and vibration of the currently executing seek operation match each other more closely in comparison to the case depicted in FIG. 6. Consequently, composite vibration (square-integrated value) of both vibrations is 103.4 rad/s$^2$, and is larger than that in the case of FIG. 6.

Figure 8:
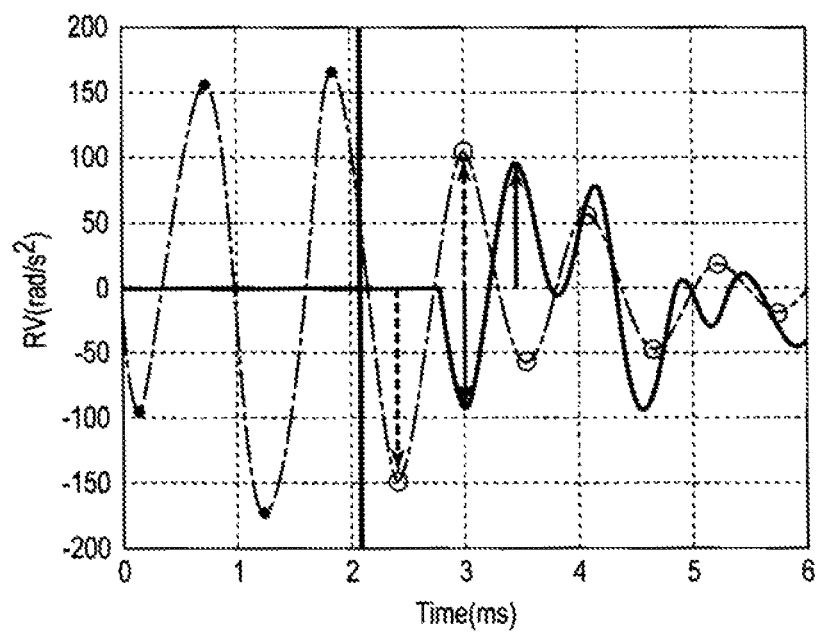
FIG. 8 illustrates an example of residual vibration and vibration caused by the currently executed seek operation when the break time is t2.

FIG. 8 illustrates vibration (shown by dash-dot line) of the previously executed seek operation and vibration (shown by solid line) of the currently executed seek operation when the break time is t2, for example, 0.85 ms. A bold vertical line represents a time indicated by an instruction to start the current seek operation. Phases of residual vibration of the previously executed seek operation and vibration of the currently executing seek operation are substantially in antiphase to each other, i.e., approximately 180° out of phase. Thus, composite vibration (square-integrated value) of both vibrations is 87.85 rad/s$^2$, and is smaller than that illustrated in the case of FIG. 6.

Flowchart of the Execution of a Seek Operation

Figure 9:
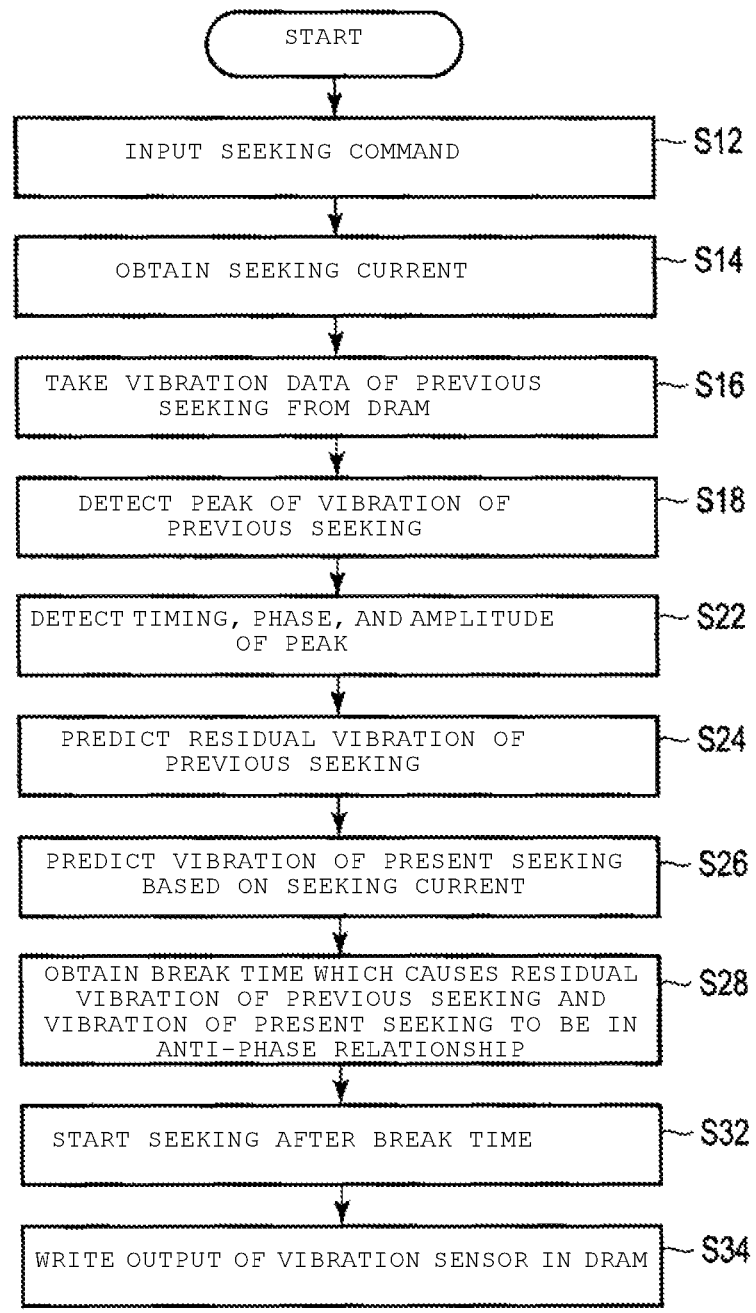
FIG. 9 is a flowchart illustrating an example of execution of a seek operation according to a first embodiment.

A flowchart of a seek operation according to the first embodiment will be described with reference to FIG. 9. The vibration sensor 48 normally operates when the magnetic disk device operates. Vibration data output from the vibration sensor 48 is stored in the DRAM 62. In the magnetic disk device, the head is positioned in an idle region, a park region, or over a specific track when no read or write commands are being executed.

In Step S12, the main controller 22 receives a read or write command from the host device. If the main controller receives the read or write command, the main controller 22 determines a track number, a sector number, and burst data from a servo decoder of the servo area 12B, in order to recognize the current position of the head, in Step S14. The main controller 22 calculates the current position of the head from the burst data, calculates the current movement speed of the head from the current position and the position prior to a seek operation. The main controller 22 calculates a distance and direction to the target track based on a difference between the target track and the current track, and determines a target speed by using the distance to the target track. The main controller 22 performs the above calculations by referencing a table that includes different entries depending on whether the seek operation is toward an inner diameter side or is toward an outer diameter side of the magnetic disk 12. The main controller 22 subtracts the current movement speed from the target speed, to obtain a seek current which flows in the voice coil motor 34.

Figure 10:
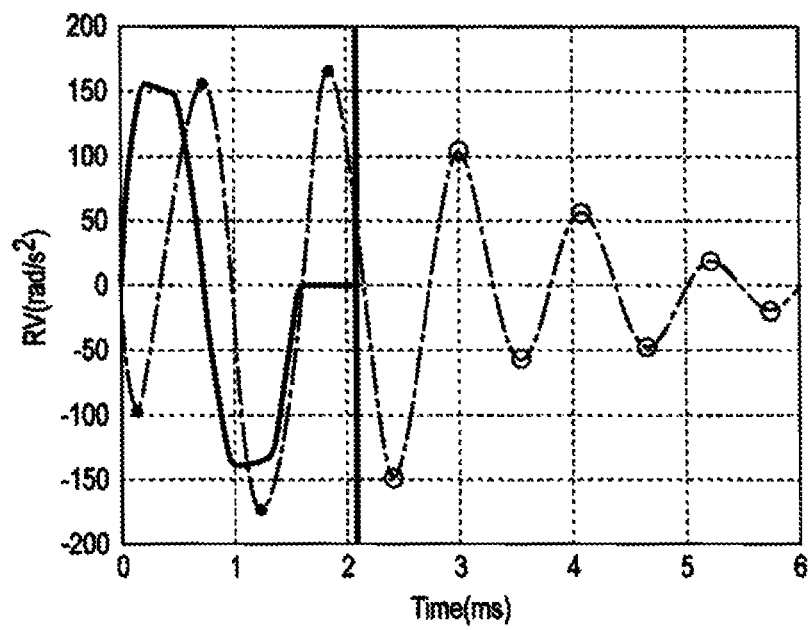
FIG. 10 illustrates an example of a relationship between a seek current and RV vibration in the first embodiment.

In Step S16, the main controller 22 reads vibration data for the previously executed seek operation, from the DRAM 62. In Step S18, as illustrated in FIG. 10, the main controller 22 detects a peak of vibration of the previously executed seek operation. A bold vertical line in FIG. 10 represents a time indicated by an instruction to start the current seek operation. A solid line in FIG. 10 indicates a seek current for the previously executed seek operation. A dash-dot line indicates vibration of the previously executed seek operation. The vibration of the previously executed seek operation is a measured value based on data read from the DRAM 62, and is measured before the time (shown by bold vertical line) indicated by an instruction to start the currently executed seek operation. The vibration of the previously executed seek has a predicted value after the time at which an instruction to start the currently executing seek operation is received. The time in Step S18 is the time indicated by an instruction to start the currently executed seek operation. Thus, the main controller 22 detects 4 peaks (shown as black circles) of the vibration of the previously executed seek operation before the time indicated by an instruction to start the present seek operation. The main controller 22 predicts 7 peaks (shown as white circles) of the residual vibration of the previous seeking after the start timing of the present seek operation, in the following steps.

Figure 11:
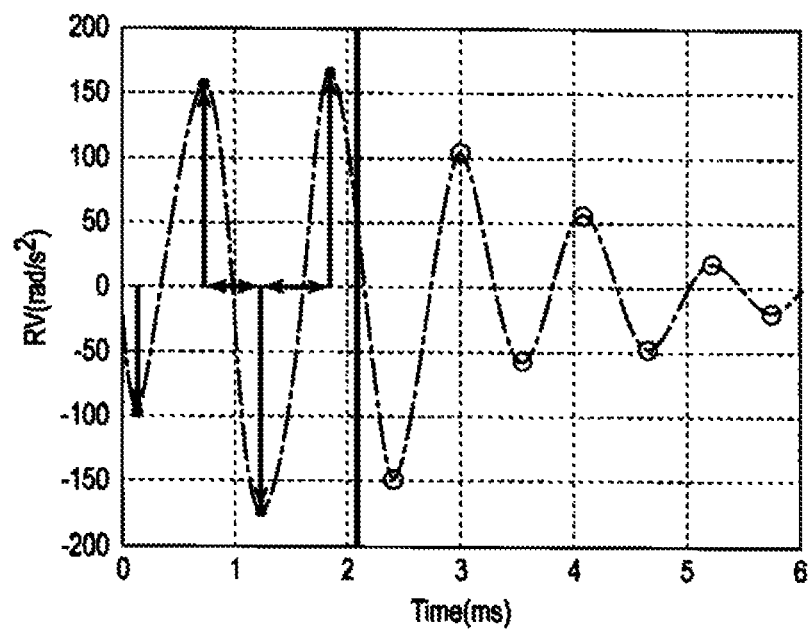
FIG. 11 illustrates a peak detection example of vibration caused by the previously executed seek operation in the first embodiment.
Figure 12:
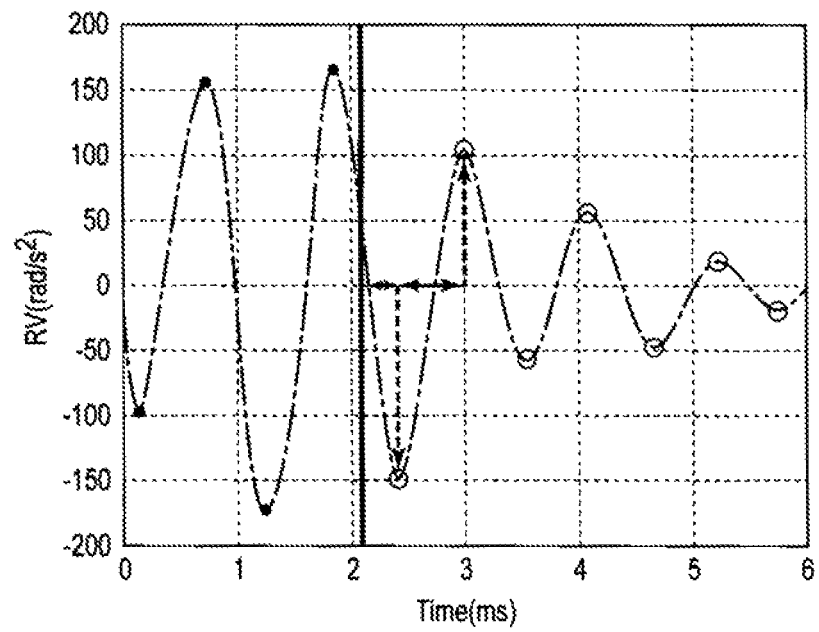
FIG. 12 illustrates a prediction example for residual vibration in the first embodiment.

In Step S22, the main controller 22 determines a timing, a phase, and an amplitude of a peak of the vibration of the previously executed seek operation, and a distance between peaks, as illustrated in FIG. 11. An average period of a peak is calculated from the distance between peaks. A reference (time point 0) time is a time corresponding to a start of the previously executed seek operation. A reference (phase 0) of the phase is a phase at the time indicated by an instruction to start the currently executing seek operation. In Step S24, as illustrated in FIG. 12, main controller 22 predicts an amplitude and a phase of a peak of the residual vibration caused by the previous seeking, based on the timing, the phase, the amplitude, and the average period of a peak obtained in Step S22.

Figure 13:
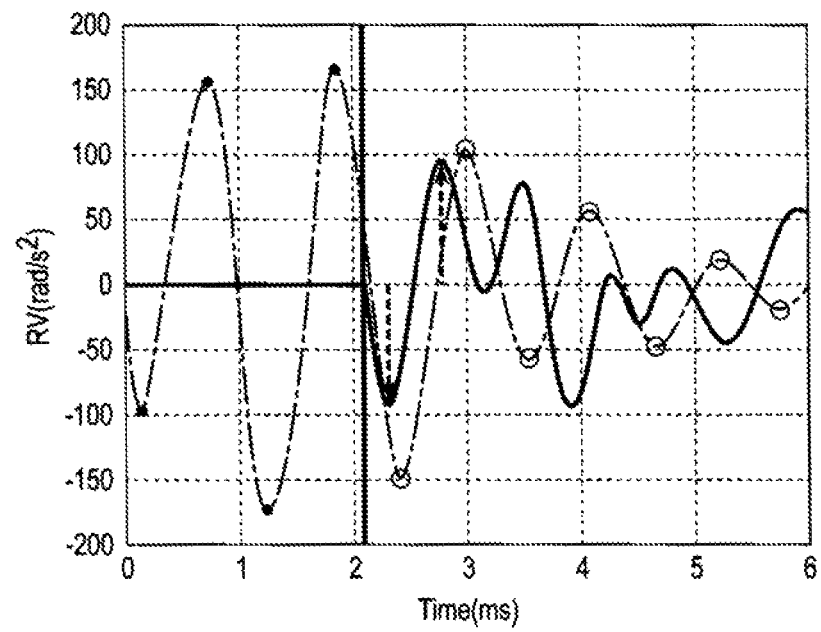
FIG. 13 illustrates a prediction example for vibration caused by the currently executed seek operation in the first embodiment.
Figure 14:
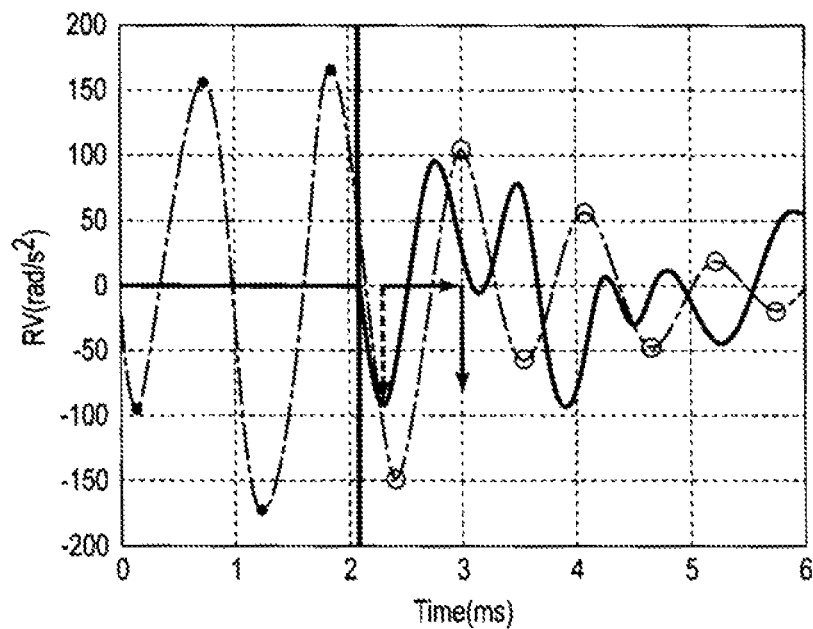
FIG. 14 illustrates an example of a break time during seek in the first embodiment.

As illustrated in FIG. 13, in Step S26, the main controller 22 predicts an amplitude and a phase of a peak of vibration generated by a seek current of the currently executing seek operation. In Step S28, as illustrated in FIG. 14, the main controller 22 determines a break time which causes the residual vibration of the previously executed seek operation and the predicted vibration of the currently executing seek operation to be in anti-phase to each other.

Figure 15:
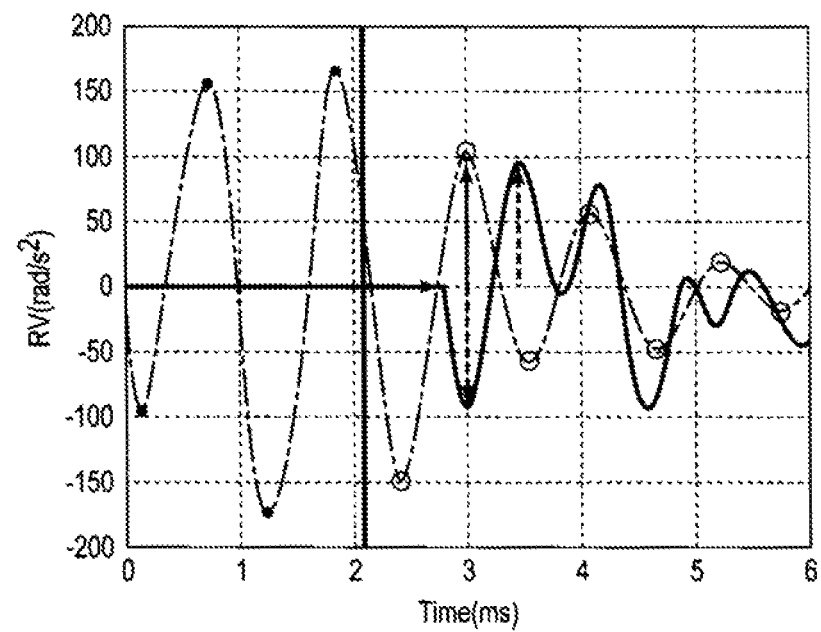
FIG. 15 illustrates an example of vibration cancellation during seek in the first embodiment.

In Step S32, as illustrated in FIG. 15, the main controller 22 delays, by the break time, the time indicated by an instruction to start the currently executing seek operation. Then, the main controller 22 sets a voltage value (digital quantity) which is proportional to the seeking current, in a power amplifier (not illustrated) of the head IC 20. The power amplifier causes the seeking current, which depends on the set voltage value, to flow in the voice coil motor 34, and controls movement of the head to the target track. If the head approaches the target track, a control mode of the head is changed from speed control to position control. As illustrated in Step S34, vibration data output from the vibration sensor 48 is normally stored in the DRAM 62.

Figure 16A:
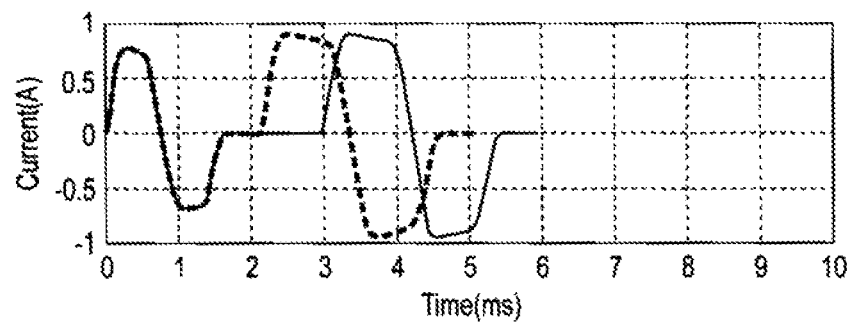
FIGS. 16A and 16B illustrate an example of composite vibration during seek according to the first embodiment.
Figure 16B:
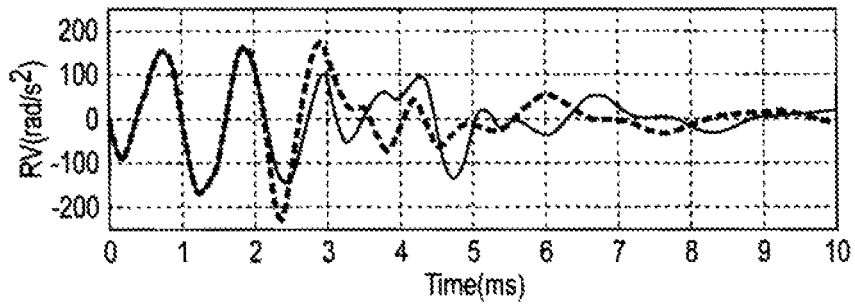

FIG. 16A illustrates a seek current of a first case (shown by solid line) where the break time of 0.85 ms is implemented when a seek operations starts, and a seek current of a second case (shown by broken line) where such a break time is not implemented. FIG. 16B illustrates RV vibration of the first case (shown by solid line) where the break time of 0.85 ms is implemented when seeking starts, and RV vibration of the second case (shown by broken line) where the break time is not provided. As indicated by the broken line in FIG. 16B, when the break time is not provided, composite vibration (square-integrated value) of residual vibration of the previously executed seek operation and vibration caused by the currently executing seek operation is 101.49 rad/s$^2$. As indicated by the solid line in FIG. 16A, when the break time of 0.85 ms is implemented at the point in time at which the currently executing seek operation would have started, composite vibration (square-integrated value) of residual vibration of the previous seeking and vibration caused by the present seeking is 87.85 rad/s$^2$. Thus, when the break time is provided, it is possible to reduce RV vibration.

Effects of the Embodiment

According to the first embodiment, if an instruction to start seeking is received, residual vibration caused by the previously executed seek operation is determined and vibration caused by the currently executing seek operation is predicted, and a start time of the currently executing seek operation is delayed so as to cause phases of both of the vibrations so as to be in anti-phase to each other. Thus, it is possible to reduce composite vibration of both of the vibrations. Thus, it is possible to precisely control the actuator.

When a duration of residual vibration is relatively long, residual vibration of multiple previously executed seek operations may be considered in addition to the residual vibration of the immediately preceding seek operation. Such vibration data output from the vibration sensor 48 are supplied to the main controller 22 and are written in the DRAM 62. However, a memory may be provided on the sensor 48 side, and the vibration data may instead be written in the memory.

Second Embodiment

The IBT method of delaying the seek start time is described as a method of executing a seek operation with reduced vibration, in the first embodiment. However, a just-in-time (JIT) method of extending a seek time may be provided in addition to the IBT method. In an example of a method of extending the seek time, changes in acceleration and/or deceleration may be performed more slowly, and thus an acceleration or deceleration period may be extended. When a seek command is executed, the instruction indicates a time at which the seek operation is to be executed. When this time is delayed and therefore the seek time is extended in duration, a seek speed can be reduced. Vibration depends on the seeking speed, and vibration is small if the seek speed is low. Extension of the seek time, (i.e., the JIT method) also includes deceleration of the seek speed.

Figure 17:
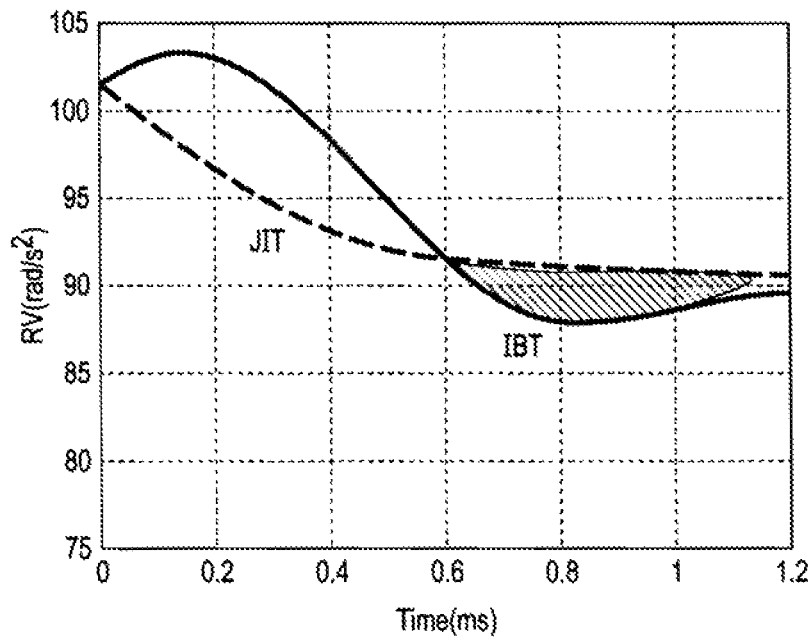
FIG. 17 illustrates a comparative example of composite vibration between an IBT method and a JIT method.

FIG. 17 illustrates an example of composite vibration in each of the IBT method and the JIT method. A horizontal axis indicates a break time in the IBT method and indicates an extension of the seek time in the JIT method. A solid line in FIG. 17 is the same as that in FIG. 5, and indicates how composite vibration (square-integrated value) is affected by the break time in the IBT method. A broken line in FIG. 17 indicates how the composite vibration (square-integrated value) is affected by the extended time in the JIT method. In this case, when the break time or extended time is short, composite vibration in the JIT method may be reduced. If the break time or extended time is equal to or longer than a certain time, composite vibration in the IBT method may be reduced.

Figure 18:
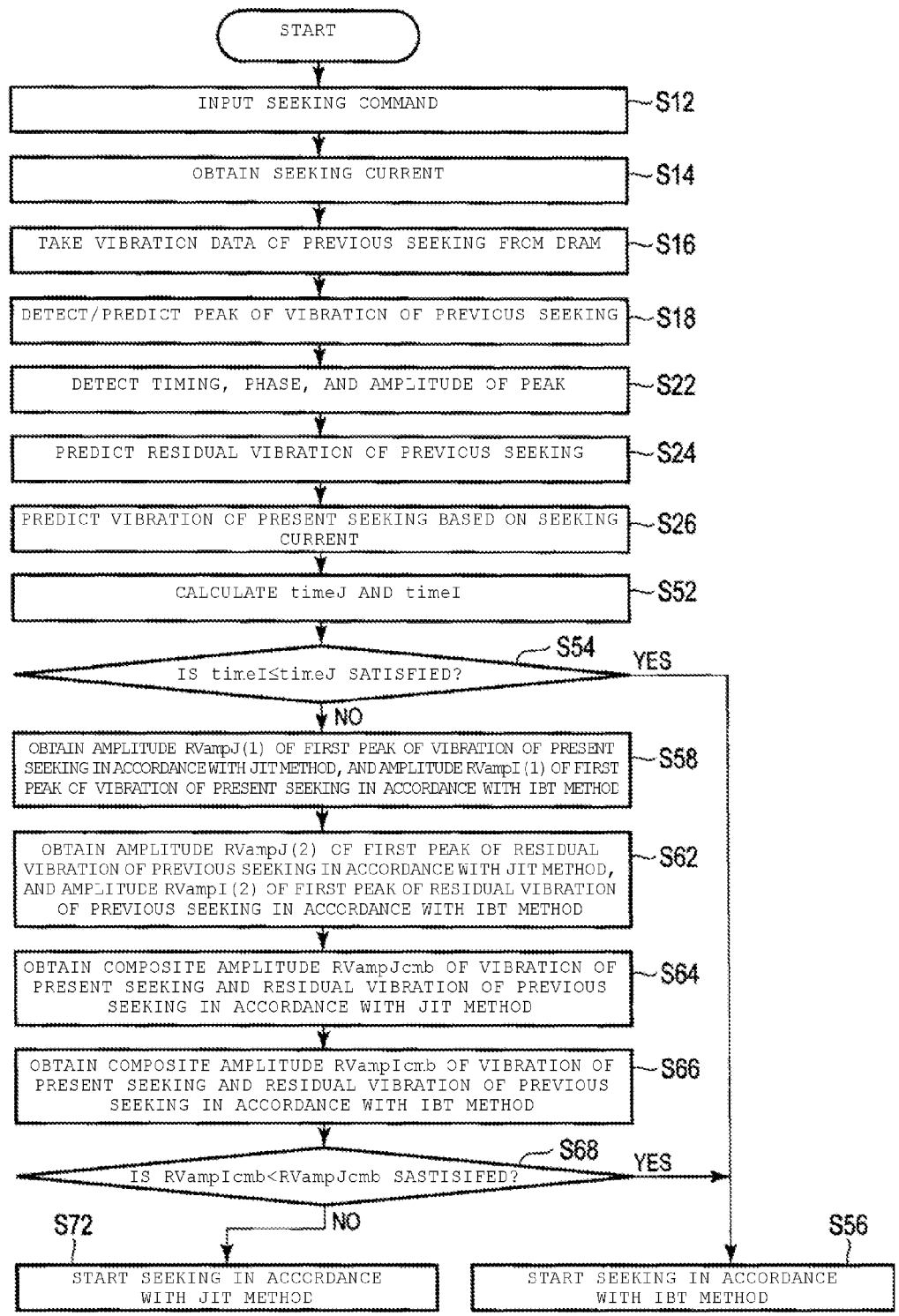
FIG. 18 is a flowchart illustrating an example of execution of a seek operation according to a second embodiment.

FIG. 18 is a flowchart illustrating the execution of a seek operation in a second embodiment.

Processes of Step S12 to Step S26 are the same as those in the first embodiment.

Figure 21:
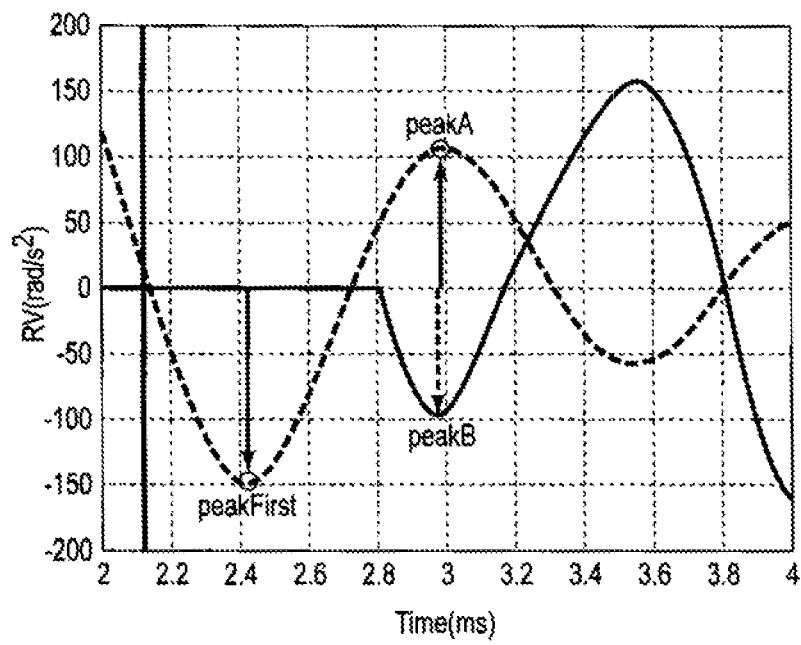
FIG. 21 illustrates an example of residual vibration and the present predicted vibration in the IBT method in the second embodiment.

In Step S52, the main controller 22 obtains a required time timeJ of the currently executing seek operation in the JIT method and a required time timeI of the currently executing seek operation in the IBT method. The required time timeJ in the JIT method is a time interval from a time at which a seek command is accepted until the corresponding seek operation is performed, i.e., when the head reaches a target sector for performing read or write. The required time timeJ is determined by a rotation waiting time that transpires before the head reaches a data sector as a target. For example, if the target sector number is defined as S1, the current sector number is defined as S0, and a servo sector time interval is defined as Ts, the required time timeJ is equal to (S1−S0)×Ts−t1. If timeJ<0 is satisfied, timeJ=timeJ+Tr is satisfied. t1 indicates the shortest seek time (which is an estimated time) and Tr indicates a disk rotation period. That is, when the seek time from S0 to S1 is shorter than the shortest seek time, waiting for one revolution of magnetic disk 12 is performed. Thus, Tr is added to the required time. The required time timeI in the IBT method is a time which causes vibration to be the smallest. In the case of FIG. 21, timeI=0.65 ms is satisfied. The required time may be assigned from the host device.

In Step S54, the main controller 22 determines whether or not timeI≤timeJ is satisfied. When the main controller 22 determines timeI≤timeJ to be satisfied, for example, when timeJ is 1.0 ms in a situation in which timeI=0.65 ms, seeking is started by the IBT method in Step S56. In this case, the break time is timeJ.

Figure 20:
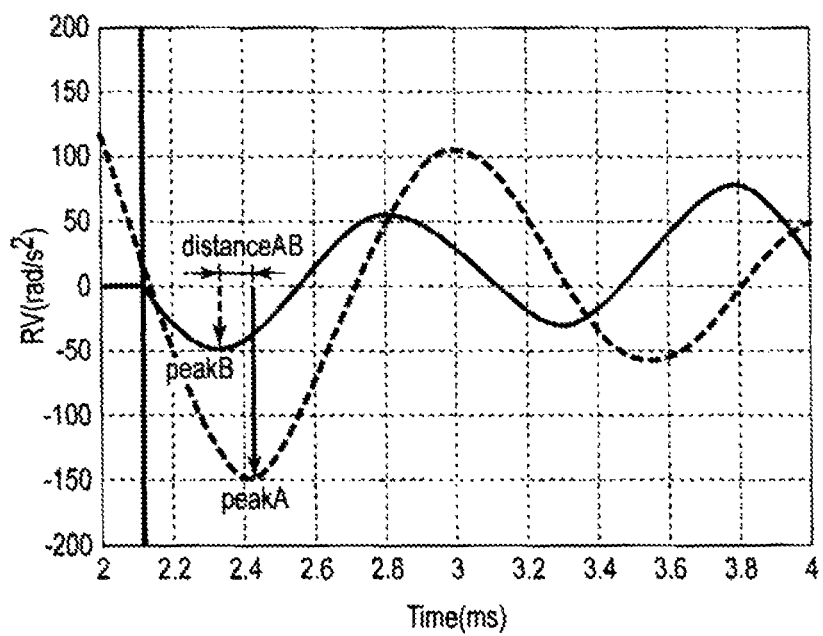
FIG. 20 illustrates an example of residual vibration and the present predicted vibration in the JIT method in the second embodiment.

When the main controller 22 determines that timeI≤timeJ is not satisfied, for example, when timeJ is 0.5 ms in a situation in which timeI=0.65 ms, the main controller 22 obtains an amplitude RVampJ(1) of the first peak of predicted vibration caused by the currently executing seek operation in accordance with the JIT method and obtains an amplitude RVampI(1) of a first peak of predicted vibration caused by the currently executing seek operation in accordance with the IBT method, in Step S58. An amplitude of a peak B of predicted vibration indicated by a solid line in FIG. 20 corresponds to the amplitude RVampJ(1) of the first peak, which is −50. An amplitude of a peak B of predicted vibration indicated by a solid line in FIG. 21 corresponds to the amplitude RVampI(1) of the first peak, which is −100.

In Step S62, the main controller 22 determines an amplitude RVampJ(2) of the first peak of residual vibration caused by the previously executed seek operation in accordance with the JIT method and obtains an amplitude RVampI(2) of the first peak, which has an anti-phase relationship with RVampI(1) of residual vibration caused by the previously executed seek operation in accordance with the IBT method. An amplitude of a peak A of predicted vibration indicated by a broken line in FIG. 20 corresponds to the amplitude RVampJ(2) of the first peak, which is −150. An amplitude of a peak A of residual vibration indicated by a broken line in FIG. 21 corresponds to the amplitude RVampI(2) of the first peak, which is 100.

Figure 19:
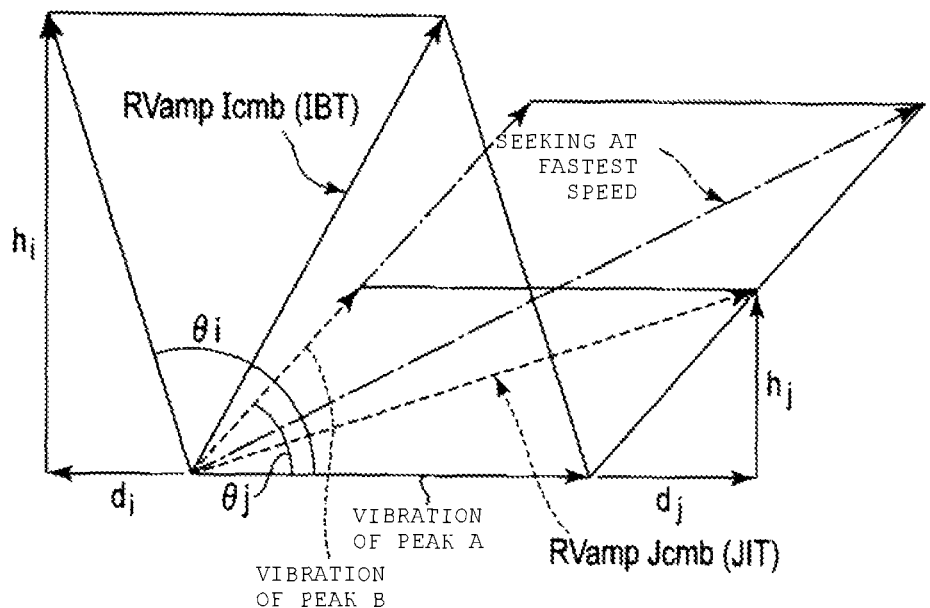
FIG. 19 illustrates an example of composite vibration in the second embodiment.

In Step S64, the main controller 22 obtains a composite amplitude RVampJcmb for the predicted vibration of the currently executing seek operation and the residual vibration of the previously executed seek operation in accordance with the JIT method. FIG. 19 illustrates the composite amplitude RVampJcmb in accordance with the JIT method, and a composite amplitude RVampIcmb for the predicted vibration of the currently executing seek operation and the residual vibration of the previously executed seek operation in accordance with the IBT method. Vibration for the peak A and vibration for the peak B may be respectively indicated by vectors, and the composite amplitude may be indicated by the sum of the vectors. The vibration for the peak A is defined as a vector (shown by solid line) in a horizontal direction, and a phase difference between a vector indicating the vibration for the peak A and a vector indicating the vibration for the peak B is defined as θj. A vector of vibration for the peak B when seeking is performed at the fastest speed is indicated by a one-dot broken line. In the JIT method, the amplitude of the peak B is set to be smaller than the amplitude of the peak B when seeking is performed at the fastest speed. Thus, a composite amplitude is set to be smaller than a composite amplitude when seeking is performed at the fastest speed. In the IBT method, the amplitude of the peak B is equal to an amplitude when seeking is performed at the fastest speed. However, the phase difference is increased from θj to θi, and thus a composite amplitude is set to be smaller than a composite amplitude when seeking is performed at the fastest speed.

The phase difference θj between the amplitude RVampJ(2) of the peak A and the amplitude RVampJ(1) of the peak B in accordance with the JIT method is obtained as follows, where "Period" indicates an average period of a peak.

θj=(distanceAB×360)/period
hj=RVampJ(1)sin(θj)
dj=RVampJ(1)cos(θj)

distanceAB indicates a time difference between the peak B and the peak A.

The composite amplitude RVampJcmb in accordance with the JIT method is determined as follows.

$$RVampJcmb = \sqrt{(RVampJ(2)+dj)^2 + hj^2} = 193$$

In Step S66, the main controller 22 determines the composite amplitude RVampIcmb for the predicted vibration caused by the currently executed seek operation and the residual vibration caused by the previously executed seek operation in accordance with the IBT method as follows. Here, if timeI>timeJ is satisfied, the break time is set to be timeI.

θi=(distanceAB+timeJ)×360/period
hi=RVampI(1)sin(θi)
di=RVampI(1)cos(θi)

When timeI>period/4 is satisfied, peak First is not canceled. Thus, ½ of RVampI(2) is added.

$$RVampIcmb = \begin{cases} RVampI(1)/2 + \sqrt{(RVampI(2)+di)^2 + hi^2} & \text{if } timeI > period/4 \\ \sqrt{(RVampI(1)+di)^2 + hi^2} & \text{otherwise} \end{cases} = 150$$

In Step S68, the main controller 22 determines whether or not RVampIcmb<RVampJcmb is satisfied. When the main controller 22 determines RVampIcmb<RVampJcmb to be satisfied, the main controller starts seeking in accordance with the IBT method in Step S56. When the main controller 22 determines RVampIcmb<RVampJcmb is not satisfied, the main controller starts seeking in accordance with the JIT method in Step S72. At this time, the extended time is timeJ.

Figure 22A:
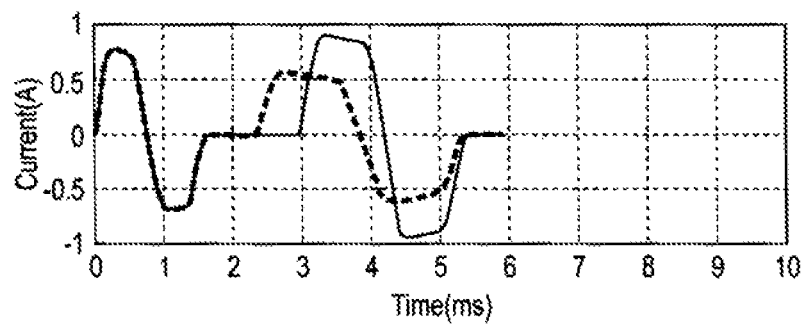
FIGS. 22A and 22B illustrate an example of composite vibration during seek according to the second embodiment.
Figure 22B:
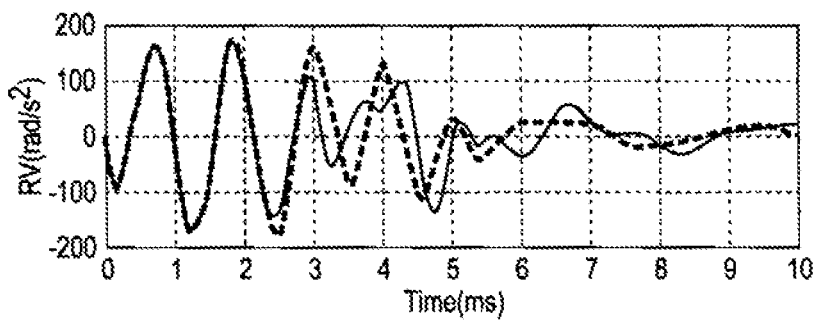
Figure 23:
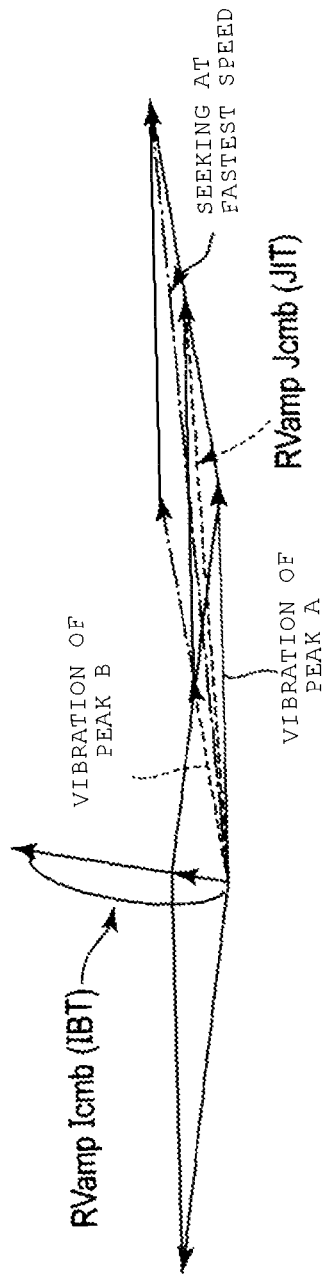
FIG. 23 illustrates another example of composite vibration in the second embodiment.

FIGS. 22A and 22B respectively illustrate an example of a seeking current and composite vibration in accordance with the IBT method (shown by solid line) and the JIT method (shown by broken line) in the second embodiment. Regarding the seeking required time of 3.7 ms, which is assigned in this case, a seeking current and composite vibration in a scenario in which the JIT method is employed are indicated by broken lines in FIGS. 22A and 22B, respectively. In this scenario, composite vibration is 95.8 rad/s$^2$. A seeking current and composite vibration in a scenario in which the IBT method is employed are indicated by solid lines in FIGS. 22A and 22B, respectively. In this scenario, composite vibration is 87.85 rad/s$^2$. RVampIcmb and RVampJcmp may be calculated as illustrated in FIG. 23, and it may be determined that composite vibration in the IBT method is smaller than that in the JIT method. For composite vibration in a scenario in which the IBT method is employed, timeI>period/4 is satisfied, and ½ of RVampI(2) is added.

According to the second embodiment, it is possible to select a seeking method which suppresses vibration to be large, from the two seeking methods.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk which includes a plurality of tracks;
   a magnetic head which is used for writing data on the magnetic disk and reading data from the magnetic disk;
   a controller configured to control seek operations of the magnetic head; and
   a vibration sensor,
   wherein the controller
      predicts a first vibration caused by a current seek operation, based on a seek control signal,
      predicts a second vibration based on vibration detected by the vibration sensor, and
      determines an adjusted start time for the current seek operation so that a phase of the first vibration does not match a phase of the second vibration.

2. The magnetic disk device according to claim 1, further comprising:
   a memory that stores vibration data output from the sensor,
   wherein the magnetic head is attached to an actuator rotated by a motor, and the controller
      determines the seek control signal for moving the magnetic head to a target track in response to receiving a seek command, and
      supplies the seek control signal to the motor at the adjusted start time.

3. The magnetic disk device according to claim 2, wherein the motor includes a voice coil motor, and
the seek control signal includes a seek current for causing the voice coil motor to perform acceleration, driving at a constant speed, and deceleration.

4. The magnetic disk device according to claim 2, wherein the first vibration is at least partially caused by rotating the motor with the seek control signal.

5. The magnetic disk device according to claim 1, wherein the controller predicts a first peak timing of the first vibration and a second peak timing of the second vibration and selects the adjusted start time of the current seek operation so that a phase of the first peak and a phase of the second peak are at least partially in anti-phase to each other.

6. In a magnetic disk device which includes a magnetic disk having a plurality of tracks, a magnetic head which is used for writing data on the magnetic disk and reading data from the magnetic disk, a controller that configured to control seek operations of the magnetic head, and a vibration sensor, a method of seeking the magnetic head, the method comprising:
   predicting a first vibration caused by a current seek operation, based on a seek control signal;
   predicting a second vibration based on vibration detected by the vibration sensor; and
   determining an adjusted start time for the current seek operation so that a phase of the first vibration does not match a phase of the second vibration.

7. The method according to claim 6, further comprising:
   determining the seek control signal for moving the magnetic head to a target track in response to receiving a seek command, and
   supplying at the adjusted start time the seek control signal to a motor for actuating the magnetic head.

8. The method according to claim 7, wherein the first vibration is at least partially caused by rotating the motor with the seek control signal.

9. The method according to claim 6, further comprising:
   predicting a first peak timing of the first vibration and a second peak timing of the second vibration; and
   selecting the adjusted start time of the current seek operation so that a phase of the first peak and a phase of the second peak are at least partially in anti-phase to each other.

10. The method according to claim 6, further comprising:
    predicting a third vibration based on vibration detected by the sensor; and
    adjusting the start time of the current seek operation so that the phase of the first vibration does not match a phase of the third vibration.

11. The method according to claim 6, wherein the second vibration occurs during the current seek operation.

12. A controller of a magnetic disk device which includes a magnetic disk having a plurality of tracks, a magnetic head which is used for writing data on the magnetic disk and reading data from the magnetic disk, and a vibration sensor, wherein the controller
   predicts a first vibration caused by a current seek operation, based on a seek control signal for moving the magnetic head to a target track,
   predicts a second vibration based on vibration detected by the vibration sensor, and determines an adjusted start time of the current seek operation so that a phase of the first vibration does not to match a phase of the second vibration.

13. The controller according to claim 12, wherein the controller:
   determines the seek control signal in response to receiving a seek command, and
   supplies at the adjusted start time the seek control signal to a motor for actuating the magnetic head.

14. The controller according to claim 13, wherein the first vibration is at least partially caused by rotating the motor with the seek control signal.

15. The controller according to claim 12, wherein the controller:
   predicts a first peak timing of the first vibration and a second peak timing of the second vibration; and
   selects the adjusted start time of the current seek operation so that a phase of the first peak and a phase of the second peak are at least partially in anti-phase to each other.

16. The controller according to claim 12, wherein the controller:
   predicts a third vibration based on vibration detected by the sensor; and
   selects the adjusted start time of the current seek operation so that the phase of the first vibration does not match a phase of the third vibration.

* * * * *